United States Patent

[11] 3,630,464

[72] Inventor William E. Fagan
 337 Trapelo Road, Belmont, Mass. 02178
[21] Appl. No. 771,946
[22] Filed Oct. 30, 1968
[45] Patented Dec. 28, 1971

[54] REEL DEVICE
 9 Claims, 10 Drawing Figs.
[52] U.S. Cl. .................................................. 242/96
[51] Int. Cl. ................................................ B65h 75/40
[50] Field of Search .................................. 242/96, 99, 100

[56] References Cited
UNITED STATES PATENTS
1,455,167 5/1923 Joslin ........................... 242/96
FOREIGN PATENTS
577,700 4/1934 Germany ..................... 242/96

Primary Examiner—Nathan L. Mintz
Attorney—Robert T. Dunn

ABSTRACT: A reel for a line includes two handles located along the axis of the reel, and adapted to be grasped by an operator's left and right hand respectively; at least one of the handles is attached to the reel by a mechanism such that movement of that handle along the axis of the reel drives the reel in rotation about the axis so that the line is wound onto or played off of the reel.

Patented Dec. 28, 1971 3,630,464

INVENTOR
WILLIAM E. FAGAN
By *Robert T Dunn*
ATTORNEY

INVENTOR
WILLIAM E. FAGAN
ATTORNEY

REEL DEVICE

This invention relates to reels and more particularly to a reel adapted to be used with kite lines, fish lines, electrical cables, etc.

Heretofore, reels for some of the above purposes have consisted of a drum or a body upon which a line is wound by rotating the body on an axis through it by rotating a plurality of handles, one of which is located eccentrically or off of the axis of rotation. In some of the prior devices, one handle is attached to the reel along the axis, so that while the operator's one hand holds the handle at the axis, the other hand rotates the eccentric handle about the axis, to thereby rotate the reel. This technique for driving the reel in rotation by applied manual power obviously requires one hand to rotate at the same speed as the reel and so the rotational speed of the reel is limited by the rotational speed of the reel is limited by the rotational speed which the operator can move his hand. Furthermore, this manual manipulation is sometimes difficult to coordinate and as a result the operator wobbles the reel as he rotates it and so the line is not wound onto or played evenly off of the reel.

It is one object of the present invention to provide a reel in which some of these disadvantages of prior devices are avoided.

It is another object of the present invention to provide a reel which can be operated by the reciprocating motion of an operator's hand, and in which the frequency of rotation of the reel is substantially greater than the reciprocation frequency of the motion of the operator's hand.

It is another object of the present invention to provide means for driving a reel in rotation by the simple manipulation of parts in translational motion along the substantially stationary axis of the reel.

It is another object of the present invention to provide such means, which is readily adjustable to drive the reel in rotation to wind up or to play out the line.

It is another object of the present invention to provide means for braking or slowing down the rotation of a reel.

It is a feature of various embodiments of the present invention to provide one or more handles for holding a reel, at least one of which is moveable along the axis of rotation of the reel and attached to the reel by a mechanism which rotates the reel in response to translational motion of the handle along the reel axis. In a number of embodiments, the attaching mechanism mechanically engages the reel and drives it in rotation, so that the reel rotation rate is increased.

In other embodiments, the attaching mechanism drives a braking device, which acts to slow down the rotation rate of the reel. The attaching mechanism is variously described as a screw-driven ratchet or a two-direction ratchet-type screwdriver mechanism.

These and other objects and features of the invention will be apparent from the following specific description taken in conjunction with the figures in which.

Figures 1, 2:
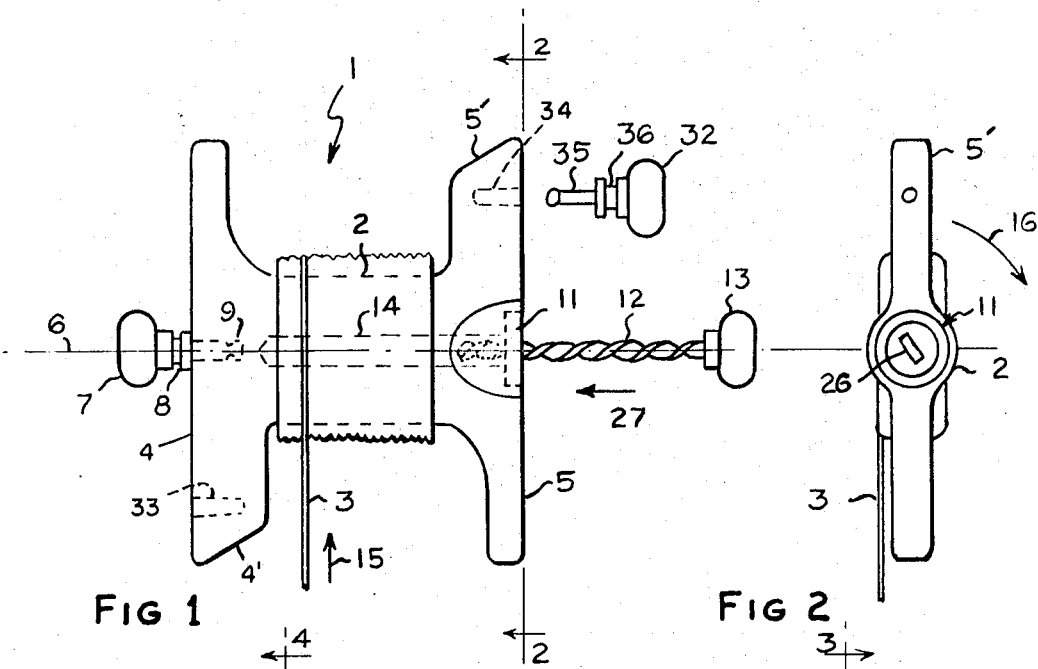
FIG. 1 is a view of a reel showing the reel body with two handles for holding by an operator, one of which connects to the body via a screw-driven ratchet, so that manipulation of this handle drives the reel in rotation to reel in a line.
FIG. 2 is a side view along line 2—2 of the device shown in FIG. 1 with the screw drive removed.

Turning first to FIG. 1, there is shown a reel body 1 having a central portion 2 on which a line 3 is wound and left and right sides 4 and 5, respectively. On one side 4 of the reel body, concentric with the axis of rotation 6 of the reel, is attached a first handle 7. The handle 7 is rotatably attached along the axis 6 by a bearing 8, which connects the handle to a member 9, which is inserted into the reel and fixed thereto.

On the other side 5 of the reel, concentric with the axis 6, is attached a screw-driven ratchet mechanism 11 which is engaged by an elongated screw member 12 affixed to a second handle 13. A cavity 14 is formed in the body of the reel along the axis 6 to accommodate passage of the elongated screw 12 as it is inserted through the screw-driven ratchet 11.

The screw-driven ratchet mechanism 11 is designed so that the screw, which is rigidly held by the handle 13, does not rotate about the axis 6. As the screw 12 is inserted through the mechanism 11, the part of the mechanism which attaches to the reel 1 is driven in rotation. Thus, an operator need only grasp handle 7 with one hand and handle 13 with the other hand, then move the handles together and apart along the axis 6 in a reciprocating fashion to drive the reel in rotation about the axis 6. The rotational direction of this drive will depend upon whether the screw 12 is a right-hand or left-hand screw and will also depend on the construction of the screw-driven ratchet mechanism 11.

Figures 3, 4:
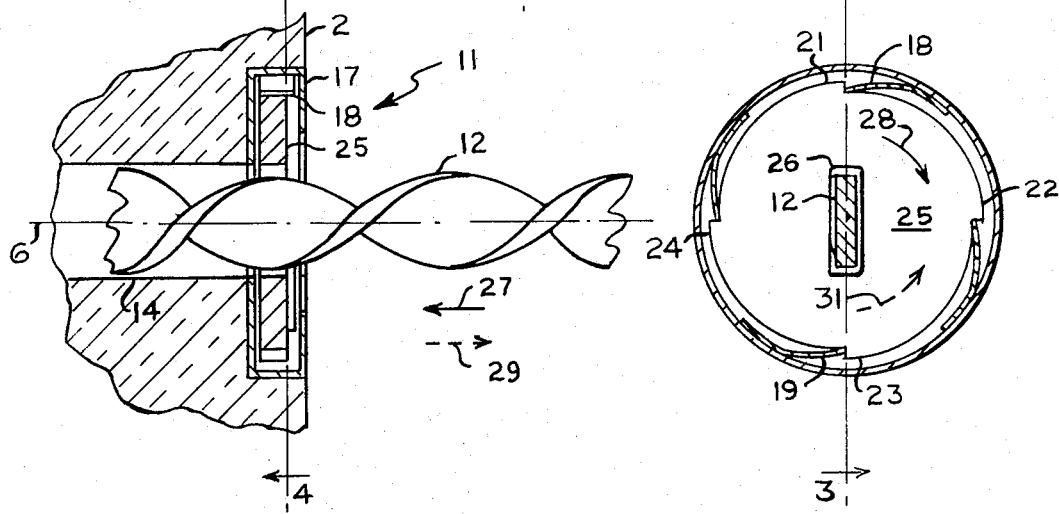
FIG. 3 is an enlarged view along line 3—3 of FIG. 4 of the broken away section of FIG. 1 revealing the screw-driven ratchet mechanism.
FIG. 4 is another view along line 4—4 of FIG. 3 of the screw-driven ratchet mechanism.

The mechanism shown in FIG. 1 and shown enlarged in FIGS. 3 and 4, is designed so that as the handle 13 is moved along the axis 6 toward handle 7, which moves the screw 12 into the body of the reel 1, the screw-driven ratchet mechanism 11 drives the reel in rotation about the axis 6 so that the line 3 is wound onto the reel. Thus, the line 3 moves in the direction of arrow 15. Then, as the handle 13 is moved away from handle 7 withdrawing the screw 12 from the body of the reel 1, the mechanism 11 coasts or idles and neither drives nor substantially impedes the rotation of the reel 1. Next, when the screw 12 is pushed into the body of the reel, the mechanism 11 again delivers torque to the reel, causing it to rotate so as to wind the line onto the reel. Thus, a power stroke is delivered to the reel, driving it in rotation each time the screw 12 is moved into the body of the reel, and the cyclic rate of this power stroke may be a substantially slower rate than the rotational rate of the reel. The ratio of the power stroke rate to the rotational rate of the reel is determined by the number of turns in the screw, which are moved through the screw-driven ratchet 11 over each power stroke.

FIG. 2 is an end view of the reel, taken as shown in FIG. 1. From this view, the power stroke causes the reel to rotate in the clockwise direction indicated by the arrow 16. In other words, when the screw 12 is moved through the screw-driven rachet into the body of the reel, the reel rotates in a clockwise direction from this view. Also, the screw in this case is a left-hand screw, as viewed in the direction of FIG. 2. Thus, in order to rotate the reel in the clockwise direction, as viewed from the right-hand side of the reel, the screw must be a left-hand screw. Likewise, it will be seen that if the screw is located on the left-hand side of the reel and drives the reel in rotation when inserted through a screw-driven ratchet on the left-hand side of the reel, the screw must be a right-hand screw in order to drive the reel in the direction of the arrow 16.

FIGS. 3 and 4 are enlarged views of the mechanism 11 to reveal the details of construction of one suitable example of a screw-driven ratchet which could be used in the reel. This includes a ratchet housing 17, which is attached to the body of the reel, preferably at the entrance to the cavity 14 in the reel that accommodates the screw. The ratchet housing contains one or more leaf springs, such as 18 and 19 attached the inner race thereof, which engages the pawls 21 to 24 on the screw follower disc 25 which is located within the housing. At the center of the disc is a slot 26 through which the screw 12 is inserted, so that the slot follows the screw twist as the screw is inserted through the slot. When the screw 12 is inserted through the slot 26 in the direction of arrow 27 (during the power stroke), the disc 25 is caused to rotate in the clockwise direction indicated by arrow 28 and in doing so the pawls engage the leaf springs and exert a rotational torque on the ratchet housing 17, which turns the reel 1 in rotation. On the other hand, when the screw is withdrawn from the reel body and moved in the direction of the broken arrow 29, the disc 25 is rotated in the direction of broken arrow 31 and so the pawls do not engage the leaf springs 18 and 19, and do not exert a torque on the ratchet housing. Quite clearly, the screw-driven ratchet mechanism shown in FIGS. 3 and 4 in detail is but one example of a suitable mechanism for driving the reel in rotation in response to the actuation of a screw along the axis of rotation of the reel.

The ends 4' and 5' of the reel in FIG. 1 are broadened as shown to accommodate an additional handle 32. For this purpose, members 33 and 34 are imbedded in the broadened ends 4' and 5', along axes parallel to the axis 6, but clearly offset considerably from axis 6. The prong 35 attached by a bearing 36 to the handle 32 is inserted into the member 33 or 34 by which the prong is gripped securely. The handle 32 is inserted into the member 33 and used in conjunction with the handle 7 to rotate the reel in either direction. It is inserted into member 34 and used in conjunction with the screw handle 13 to rotate the reel in the counterclockwise direction as viewed in FIG. 2.

Figure 5:
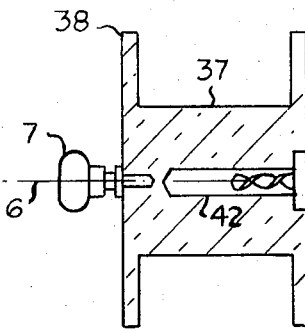
FIG. 5 shows a similar structure on a drum-shaped reel.

FIG. 5 illustrates use of the same mechanical structures described above with reference to FIGS. 1 to 4 with a drum-shaped reel, including a cylindrical drum 37 with disc shaped ends 38 and 39 on each side, which serve the function of ends 4 and 5 in FIG. 1. Here, handle 7 may be constructed and connected the same as handle 7 in FIG. 1 to the left side of the drum, along the drum axis 41 and a screw-driven ratchet 11, handle 13, and screw 12, may be constructed and connected the same as parts 11, 13 and 12, in FIG. 1, to the right side of the drum. A cavity 42 is provided along the axis of the drum to accommodate the screw as it is inserted through the mechanism 11 on the drive stroke.

Figure 6:
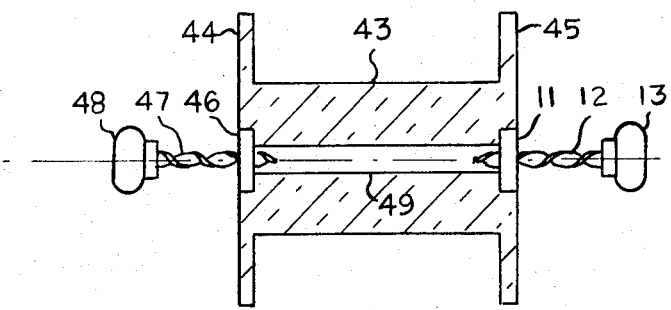
FIG. 6 shows a drum-shaped reel with left-hand and right-hand screw-driven ratchet mechanism on opposite sides, both of which drive the reel in rotation.
Figure 7:
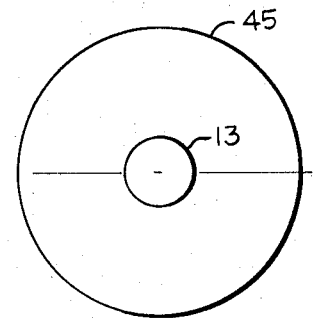
FIG. 7 is a side view of either of the devices in FIGS. 5 or 6.

FIGS. 6 and 7 illustrate another embodiment in which the drum-shaped reel 43 having left and right sides, 44 and 45, is again equipped on the right-hand side with a mechanism 11, engaging the screw 12, attached to a handle 13. In addition, the left side of this reel is similarly equipped, but with a screw-driven ratchet mechanism 46, engaging a screw 47, fixed to a handle 48, such that when the screw 47 is inserted through the mechanism 46 into the opening 49 along the reel axis 51, a torque is delivered by mechanism 46 to the reel and this torque is in the same direction as the torque delivered by mechanism 11 to the reel when the screw 12 is inserted into the body of the reel. Thus, when the handles 13 and 48 are moved together along the axis 51 of the reel, both of the mechanism 11 and 46 deliver torque to the reel compelling it to rotate in the same direction about the axis. This embodiment enables the operator to pump the reel in rotation with both hands simultaneously or to hold either of the handles stationary and pump the other.

Figure 8:
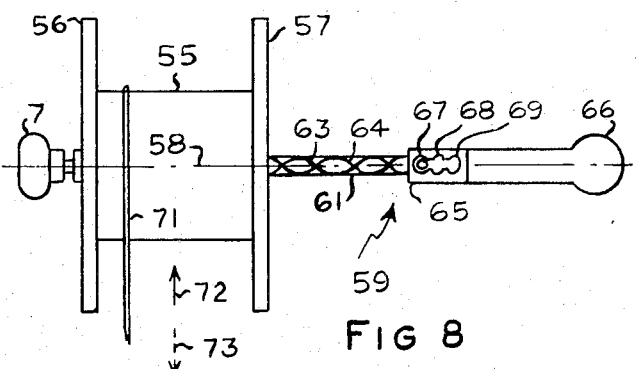
FIG. 8 illustrates an embodiment employing a two-direction ratchet-type screwdriver mechanism for driving the reel in rotation.

The embodiment in FIG. 8 is a drum-shaped reel 55 equipped with left and right disc-shaped ends 56 and 57. On one side (i.e. the left side) is a pivotally mounted handle 7 which may be identical to the handle 7, shown in FIG. 1. It is equipped on the right side with a structure 59, which is the equivalent of a two-direction, ratchet-type screwdriver. This structure includes a shaft 61 which is fixedly attached to the drum 55 along the axis 62 thereof. The shaft is equipped with left and right-hand screw tracks 63 and 64, and the shaft slides within an adjustable track follower 65, which is attached to an elongated hollow handle 66. The track follower 65 is adjustable to any of three positions by manipulating a sliding member therein to the positions 67, 68 or 69. In position 67, as the track follower 65 is moved along the shaft 61, it follows the left-hand track 63. In the idle position 68, it follows neither track, and in position 69, it follows the right-hand track 64.

Thus, when position 67 is selected and the handle 66 is moved along the axis 62 toward handle 7, at the opposite side of the reel, the shaft 61 is rotated in the clockwise direction as viewed from the right side of the reel which causes the line 71 on the reel to move in the direction of arrow 72. On the other hand, when the track follower is in the position 69 and handle 66 is moved towards handle 7, the shaft 61 is rotated counterclockwise and the line is played off the reel in the direction of arrow 73. In the idle position 68, the reel is free to rotate in either direction when the handles 66 and 7 are held stationary by the operator.

Figure 9:
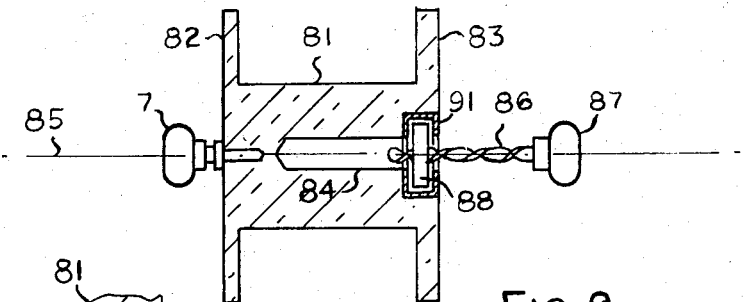
FIGS. 9 and 10 illustrates an adaptation of any of the above-described mechanisms to a braking mechanism, so that the torque actions which drive the wheel in the above mentioned figures, brake the reel and slow its rotation about the axis.
Figure 10:
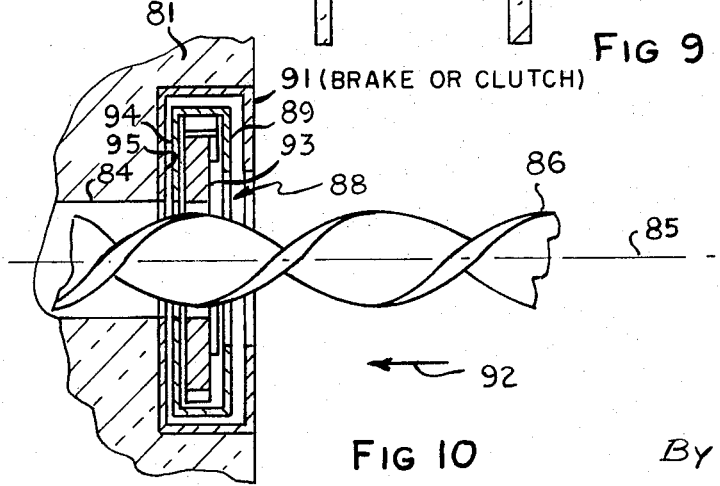

FIGS. 9 and 10 illustrate another embodiment in which the drive mechanisms described above, with respect to FIGS. 1 to 4, does not directly drive the reel in rotation, but engages the reel in a slipping fashion so that the drive mechanism can slow or brake reel rotation as well as drive the reel in rotation. In this embodiment, the reel consists of a cylindrical drum 81 with left and right ends 82 and 83 and a handle 7 on the left side, which may be constructed substantially the same as handle 7 in FIG. 1 and attached to the reel in the same manner. A bore or cavity 84, through the center of the reel along the reel axis 85, accommodates passage of the left-hand screw 86, when the operator gripping the handle 87 rigidly attached to the screw 86 pushes the screw through the screw-driven ratchet mechanism 88 from right to left. This handle, screw, and ratchet mechanism may be constructed substantially as described above with reference to the handle, screw and ratchet mechanism 13, 12 and 11, shown in FIG. 1. However, the ratchet housing 89 is not connected directly to the reel body, as the ratchet housing in FIG. 1, but is free to rotate within a brake housing 91, which is fixedly attached to the body 81 of the reel.

In operation, when the screw 86, in FIGS. 9 and 10, is moved in the direction of arrow 92, through the screw-driven ratchet mechanism 88, the ratchet housing 89 is rotated in a clockwise direction by the screw follower disc 93 and the outside surface 94 of the housing bears on the inside surface 95 of the brake housing 91, delivering a rotational torque to the reel which is in the clockwise direction as viewed from the right side of the reel. If at the same time, the reel is rotating in the counterclockwise direction, then this rotational torque will brake or slow down the counterclockwise rotation of the reel. On the other hand, if the reel is not rotating, then this clockwise torque will cause the reel to rotate in the clockwise direction. Thus, the mechanism shown in FIGS. 9 and 10 performs the functions of a brake or clutch in delivering a torque generated by the motion of the screw through the ratchet mechanism and so it can be used to drive or to brake the rotation of the reel.

This completes description of a number of embodiments of the invention wherein certain ratchet-type mechanisms or their equivalents are employed to exert a rotational torque on a reel by delivering a translational actuation along the axis of rotation of the reel.

What is claimed is:

1. A reel device for a line comprising, a body on which said line is wound when said body is rotated,
    a first handle rotatable attached to one side of said body for holding said device while said body rotates on said axis,
    means connected to the opposite side of said body including a screw for driving said body in rotation about said axis when said screw thereof is moved along said axis, and
    a second handle rigidly attached to said screw for holding said device and moving said screw along said axis to rotate said body.

2. A reel device as in claim 1 and in which said driving means includes,
    an elongated screw member fixedly attached to said second handle,
    ratchet means attached to said body,
    cam means on said ratchet means for engaging said screw member.

3. A reel device as in claim 1 and in which,
    said line is a kite line controlled by an operator, said first handle is adapted for holding by said operator with one hand, said second handle is adapted for holding by said operator with the other hand, and said driving means is such that said operator readily moves said handles toward and away from each other in a pumping fashion to rotate said reel on said axis.

4. A reel device as in claim 3 and in which said driving means includes, a screw and a screw-driven ratchet and said second handle is attached to said screw thereof.

5. A reel device as in claim 3 and in which said driving means includes, an elongated screw member fixedly attached to said second handle, ratchet means attached to said body, cam means on said ratchet means for engaging said screw member.

6. A reel device as in claim 1 and in which said driving means includes, a mechanism having a member which is rotated about said axis when said driving means parts are moved along said axis, and means attached to said body which slideably engages said mechanism member over a circular path concentric with said axis.

7. A reel device for a line comprising, a body on which said line is wound when said body is rotated, a first handle rotatable attached to one side of said body for holding said device while said body rotates on said axis, and a second handle attached to a mechanism which is the mechanical equivalent of a two-direction ratchet-type screwdriver on the opposite side of the body having the rotated parts thereof fixedly attached to the body for driving the body in rotation about said axis when the second handle is moved toward said first handle along said axis.

8. A reel device for a line comprising, a body on which said line is wound when said body is rotated, a first handle rotatable attached to one side of said body for holding said device while said body rotates on said axis, means connected to the opposite side of said body for driving said body in rotation about said axis when parts thereof are moved along said axis, and a second handle attached to said second mentioned means for holding said device and moving said parts along said axis to rotate said body, said driving means including, an elongated member containing left- and right-hand screw tracks fixedly attached at one end to said body, adjustable cam means for following one of said tracks at a time, and said second handle is fixedly attached to said adjustable cam means, whereby motion of one of said handles relative to the other along said axis with said cam adjusted to one position drives said body in one rotational direction about said axis, and said motion with said cam adjusted to another position drives said body in the opposite rotational direction about said axis.

9. A reel device for a kite line controlled by an operator comprising;

a body on which the kite line is wound when said body is rotated;

a first handle adapted for holding by one hand rotatable attached to one side of said body for holding said device while said body rotates on said axis;

means connected to the opposite side of said body for driving said body in rotation about said axis when parts thereof are moved along said axis; and a second handle attached to said driving means for holding said device and moving said parts along said axis to rotate said body;

said driving means including, an elongated member containing left- and right-hand screw tracks fixedly attached at one end to said body, adjustable cam means for following one of said tracks at a time, and said second handle is fixedly attached to said adjustable cam means whereby motion of one of said handles relative to the other along said axis with said cam adjusted to one position drives said body in one rotational direction about said axis, and said motion with said cam adjusted to another position drives said body in the opposite rotational direction about said axis.

* * * * *